F. W. BALDWIN.
FLYING MACHINE.
APPLICATION FILED MAR. 23, 1909.

1,010,842.

Patented Dec. 5, 1911.
6 SHEETS—SHEET 6.

Witnesses
Ruth C. Fitzhugh.
Gustave R. Thompson.

Inventor
Frederick W. Baldwin.
By Mauro, Cameron, Lewis & Massie
Attorneys

UNITED STATES PATENT OFFICE.

FREDERICK W. BALDWIN, OF TORONTO, ONTARIO, CANADA, ASSIGNOR TO CHARLES J. BELL, TRUSTEE, OF WASHINGTON, DISTRICT OF COLUMBIA.

FLYING-MACHINE.

1,010,842.　　　　　Specification of Letters Patent.　　Patented Dec. 5, 1911.

Application filed March 23, 1909. Serial No. 485,281.

*To all whom it may concern:*

Be it known that I, FREDERICK W. BALDWIN, of Toronto, Canada, now residing at Baddeck, Nova Scotia, Canada, have invented a new and useful Improvement in Flying-Machines, which invention is fully set forth in the following specification.

This invention relates to flying machines, and more particularly to that class of flying machines ordinarily known as "aeroplanes", but more properly designated "aerodromes", and has for its object to produce a structure of this character which shall combine maximum strength and minimum weight; shall offer a minimum of resistance to the air when in flight; shall be of great rigidity; and shall readily respond to the various devices employed for steering the same and restoring the lateral balance or equilibrium thereof when such has become disturbed; and shall be readily caused to rise or fall at the will of the aviator, and be readily assembled and disassembled.

It has heretofore been proposed to construct machines of this character in which the supporting surfaces are made flexible to the end that the marginal portions thereof may be warped or flexed so that the different ends of the supporting surfaces on the opposite sides of the longitudinal medial line of the machine present different angles of incidence; that is, the marginal portion of the supporting surface on one side presents a greater angle of incidence than does the marginal portion on the opposite side of the machine for the purpose of restoring the lateral balance or equilibrium of the machine as a whole. In contradistinction to such flexible structures whose marginal portions are warped or flexed for restoring the lateral balance of the machine, the structure of the present invention is provided with rigid non-flexible supporting surfaces. Reliance is placed upon elements forming no part of the supporting surface proper for maintaining or restoring the lateral balance of the machine. Such elements for maintaining the lateral balance of the machine may be of any suitable and effective kind. Preferably, however, these elements consist of lateral balancing rudders located on opposite sides of the longitudinal medial line of the machine, and preferably near the lateral extremities of the supporting surfaces. These devices, of whatever form, for maintaining or restoring the lateral balance of the machine, however, form no part of the present invention, which invention relates more particularly to the structure of the supporting surfaces of the machine and the means for uniting such supporting surfaces into a perfectly rigid and non-flexible structure as a whole.

One of the distinguishing features of the present invention consists of a structure having a plurality of superposed rigid supporting surfaces of a concavo-convex form with their concave sides toward each other, so that their central portions are farther apart than their marginal portions, instead of the surfaces being parallel to each other as in the construction heretofore employed. In some instances the concavo-convex form may be such that the supporting surfaces will be curved toward each other in fore and aft direction, the upper surface having its upper side and the lower surface its lower side convex in fore and aft direction. Preferably, however, the upper supporting surface has its upper side convex and the lower supporting surface has its lower side convex in a direction from side to side, while said surfaces are approximately parallel along the lines where they would be cut by any vertical fore and aft plane. This concavo-convex form presents several advantages. It lends itself to rigidity of construction of the machine as a whole; it has advantages when the machine is struck by cross gusts of air during flight; and when the marginal portions of the lower supporting surface are upturned, so to speak, it enables these portions to clear obstacles which would otherwise be struck by said portions when the machine is on the ground, and for the same reason facilitates landing of the machine at the termination of a flight.

In addition to the foregoing the invention consists in certain specific details of construction and combination of parts which will hereinafter be described and then specifically pointed out in the claims.

The inventive idea involved is capable of receiving a variety of mechanical expressions, one of which, for the purpose of illustrating the invention, is shown in the accompanying drawings; said drawings, however, are designed merely to facilitate a description of the invention as a whole and are not to be taken as defining the limits of the invention, reference being had to the claims for this purpose.

In said drawings

Figure 4:
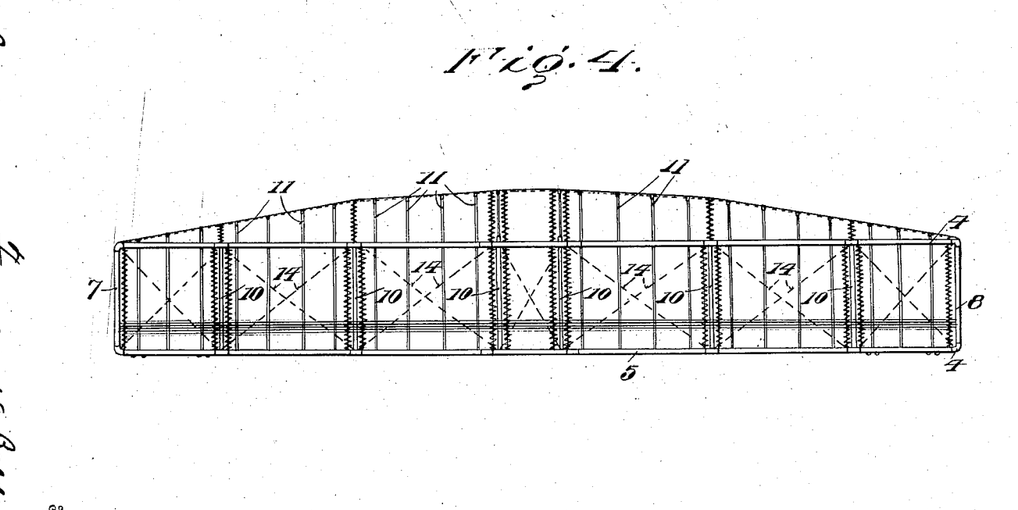
Fig. 4 is a plan view of one of the supporting surfaces.

Referring to the drawings, in which like numerals indicate corresponding parts, 1 is the upper and 2 the lower one of a pair of superposed supporting surfaces of concavo-convex form (suitably spaced by vertical struts or compression members) with their concave sides turned toward each other. The general form of construction of the two supporting surfaces 1 and 2 is the same, and, therefore, a specific description of one will suffice for both. A plan view of these supporting surfaces is shown in Fig. 4. Generally stated, each of the supporting surfaces is provided with a framework 4, preferably rectangular in form, over which is stretched a suitable fabric constituting the supporting surface proper, which fabric is preferably impervious to air, the front line of the fabric corresponding with the front line 5 of the framework 4, the lateral marginal lines of the fabric, and, therefore, of the supporting surface, corresponds with the lateral marginal lines 6 and 7 of the framework. The rear line, however, of the fabric extends at the central portion a suitable distance beyond the rear member of the frame 4, and at the central portion of the machine this rearward extension is greater than at any other portion, gradually tapering off from the central portion toward the lateral marginal lines 6 and 7 where the depth from front to rear of the fabric constituting the supporting surface is approximately equal to that of the frame 4.

Figures 9, 10:
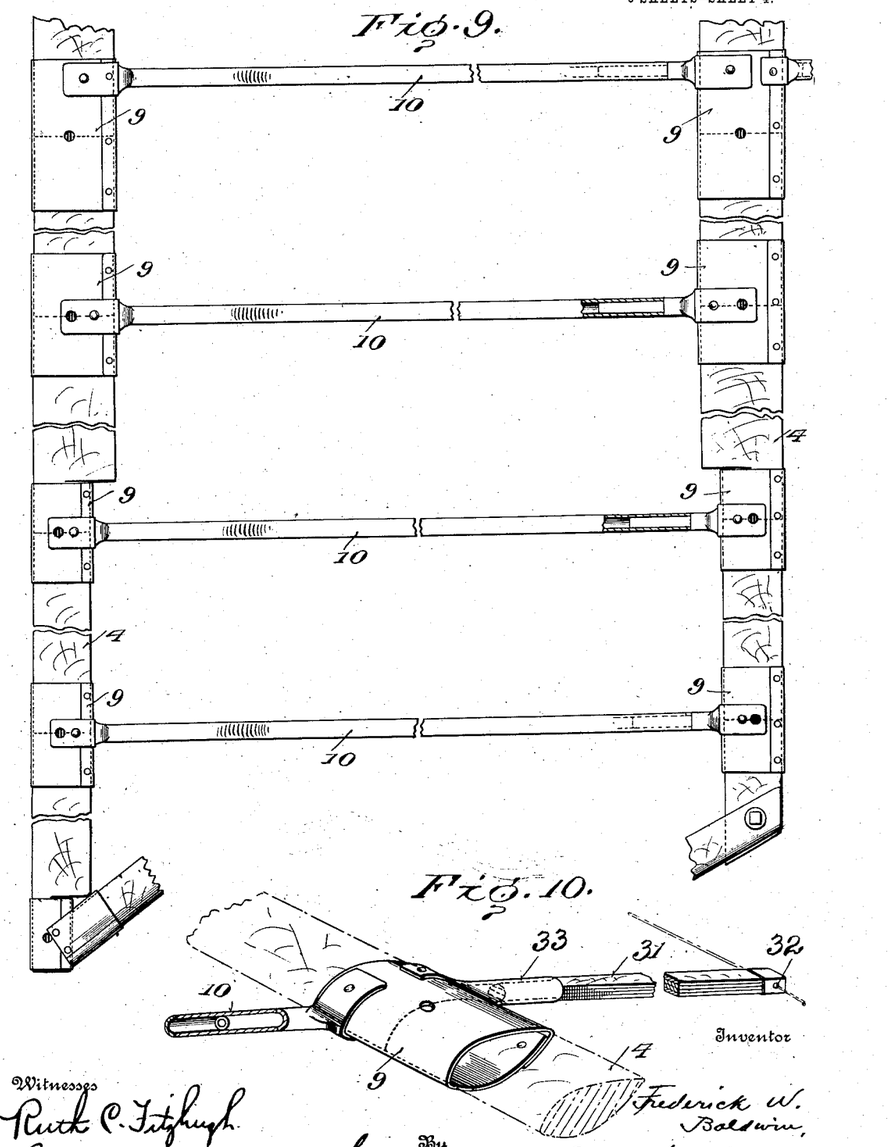
Figs. 9 and 10 are broken details illustrating the manner of constructing the framework of the supporting surfaces.

The framework 4 is preferably of wood, and, in cross section, may be of any desired shape, preferably, however, it is fish-shaped in cross section (Fig. 10), thus presenting a sharp or cutting edge for cleaving the air, whereby maximum strength of frame and minimum resistance to movement through the air are attained. Preferably also the front and rear members of the framework are not made of a single integral piece, but are made up of sections whose ends abut each other, said ends fitting in suitable sockets 9 (see Figs. 9 and 10), the sections at the central portion of the framework being the larger and gradually becoming smaller out toward the lateral margins of the frame. The framework is provided with transverse members 10 extending from the front to the rear member of the frame at suitable intervals, which members 10 are preferably formed of some light metallic tubing and are joined to the sockets 9 in any suitable manner.

Figure 5:
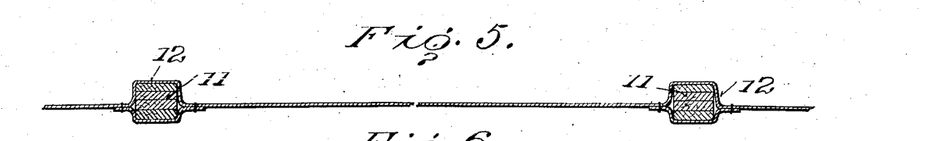
Fig. 5 is a sectional detail showing the manner of constructing the ribs for the supporting surfaces.
Figure 6:
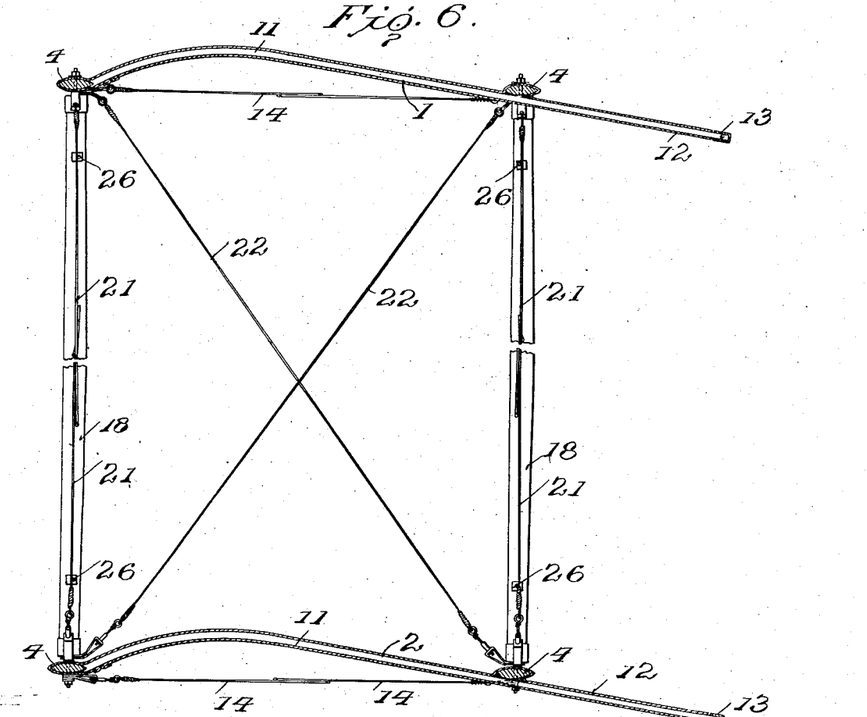
Fig. 6 is a vertical section through the superposed supporting surfaces extending from front to rear, and illustrating the curvature of said surfaces at or near the central portion of the machine.
Figure 7:
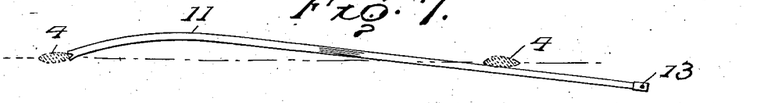
Figs. 7 and 8 are details illustrating the gradual decrease in the curvature of the surfaces toward the lateral marginal portions thereof.
Figure 8:
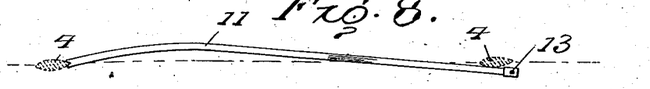

For the sake of giving the desired surface shape to the fabric constituting the supporting surface and also for the purpose of stiffening the same, ribs 11 are provided which fit in pockets 12 in the fabric, which pockets extend from the forward line of the supporting surface to the rear thereof and are preferably uniformly spaced. These ribs may be constructed in any suitable manner and of any suitable material, but preferably they are made of a laminated structure composed of several layers of wood glued together, as shown in cross-section in Fig. 5. This manner of forming the ribs gives a strong, light structure, and also enables the ribs to maintain the curved form hereinafter referred to. These ribs preferably are not fixedly secured to the framework but have their forward ends abutting the forward member of the frame, as clearly shown in Figs. 6, 7 and 8, and their rearward portions extending under but adjacent to the rear member 4 of the framework. Moreover, these ribs are not straight but are of the curved formation shown in Figs. 6, 7 and 8. At the central portion of the machine the curve at the forward portion of the rib is such as shown in Fig. 6, and from the central portion outward toward the lateral margins of the machine the curve becomes less and less in the ribs, as shown in Figs. 7 and 8, until the rib next to the lateral marginal portion of the machine has a very slight curvature, such, for example, as that shown in Fig. 8. A wire or cord extends from one rear marginal corner of the framework along the rear ends of the several ribs to the other or rear marginal corner, said cord or wire suitably engaging the rear end of each rib, preferably by passing through an opening 13 formed in the rear end of each rib (see Figs. 6, 7 and 8). The sectional frame having been assembled with the ends of the several sections abutting each other within the sockets 9 and the transverse members 10 having been put in place and preferably riveted to said sockets, the entire framework is stiffened and held together by a series of diagonal cross-wires 14, shown in dotted lines in Fig. 4, said cross-wires being secured to the sockets in any suitable manner, as, for example, by the adjustable clips 15, Figs. 11 and 12, provision being made for tightening the wires 14 by any suitable means, as the nuts 16 on the threaded rods 17.

The two supporting surfaces being thus constructed are superposed one above the other and are separated by suitable vertical struts 18, preferably of the same or substantially the same cross-sectional shape as the frame members 4. When in position these struts constitute vertical compression members in a truss-like construction, and have considerable extension in the fore and aft direction, but are very thin in a lateral direction to reduce head resistance and weight. The strains to which these thin struts or compression members are subjected are liable to produce lateral deflection thereof, and to prevent this the compression members are supported by lateral truss-wires as hereinafter described. These struts or compression members, however, are not fixedly secured to either the members 4 or the sockets 9, but preferably have their upper and lower ends entering sockets 19, the one extending upward from the socket 9 on the frame of the lower supporting surface and the other extending downward from the socket 9 on the frame of the upper supporting surface, as will be readily understood from an inspection of Figs. 6, 11 and 12. The socket members 19 may be secured to the sockets 9 in any suitable manner, as by the bolt and nut construction 20 shown in Fig. 11.

Figure 1:
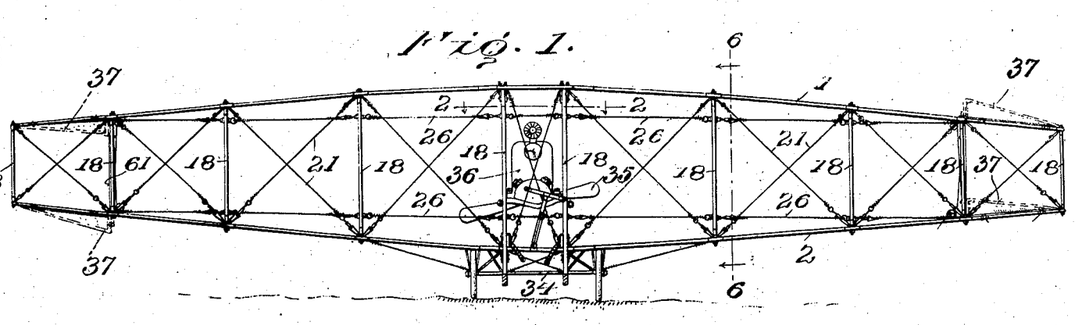
—Figure 1 is a front elevation of the structure as a whole.
Figure 2:
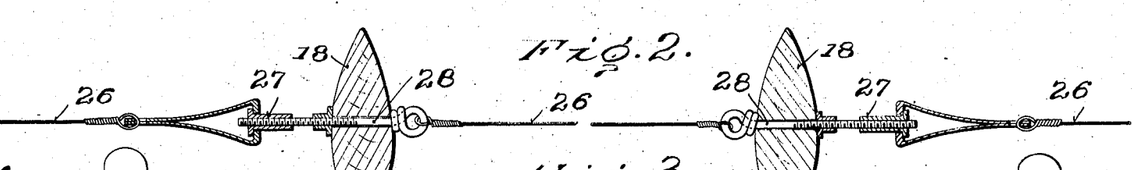
Fig. 2 is a detail horizontal cross-section through two of the compression members or struts on the line 2—2 of Fig. 1, showing the means for tying the struts together to prevent lateral flexion thereof.
Figure 11:
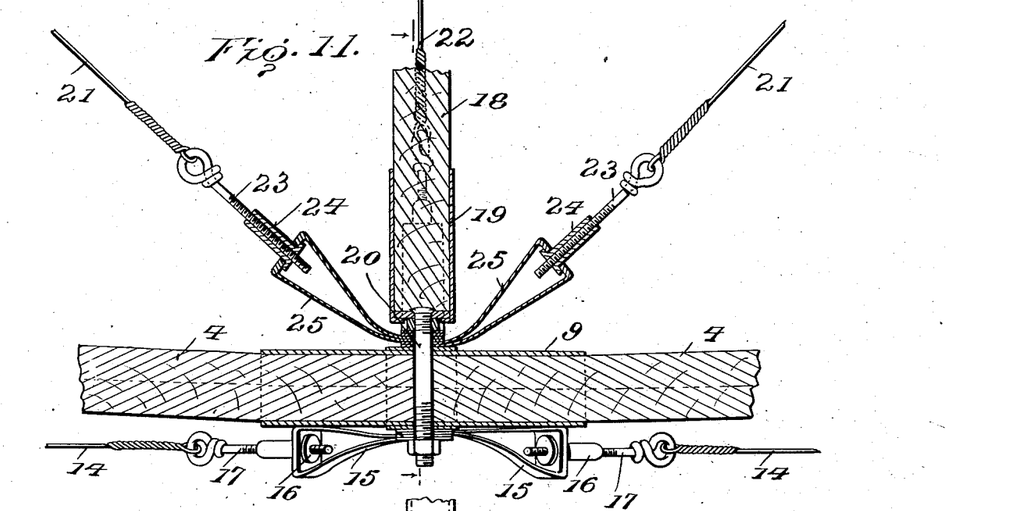
Figs. 11, 12, 13, 14 and 15 are detail views illustrating joints preferably employed in the construction of the machine as a whole.
Figure 12:
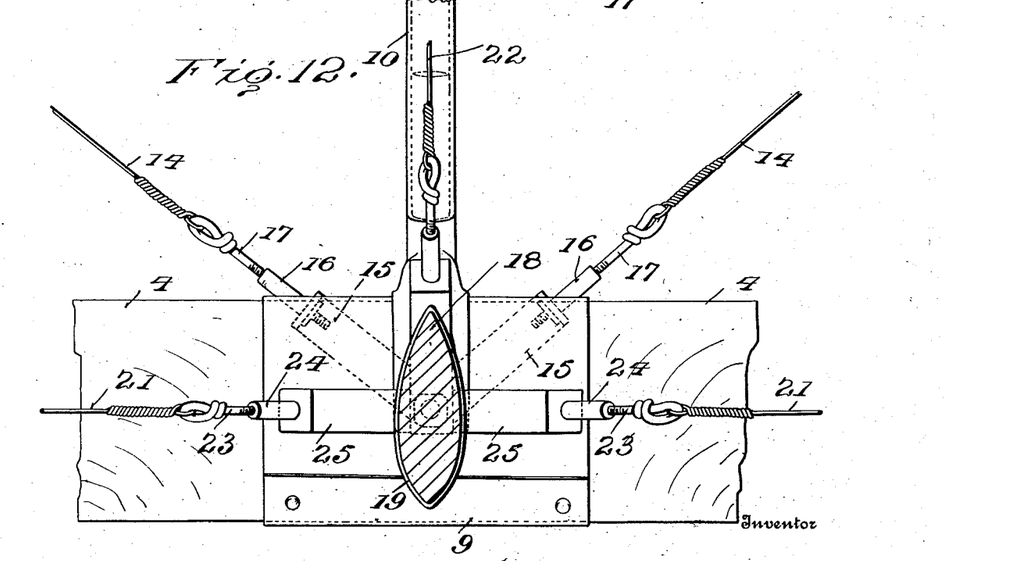
Figures 13, 14, 15:
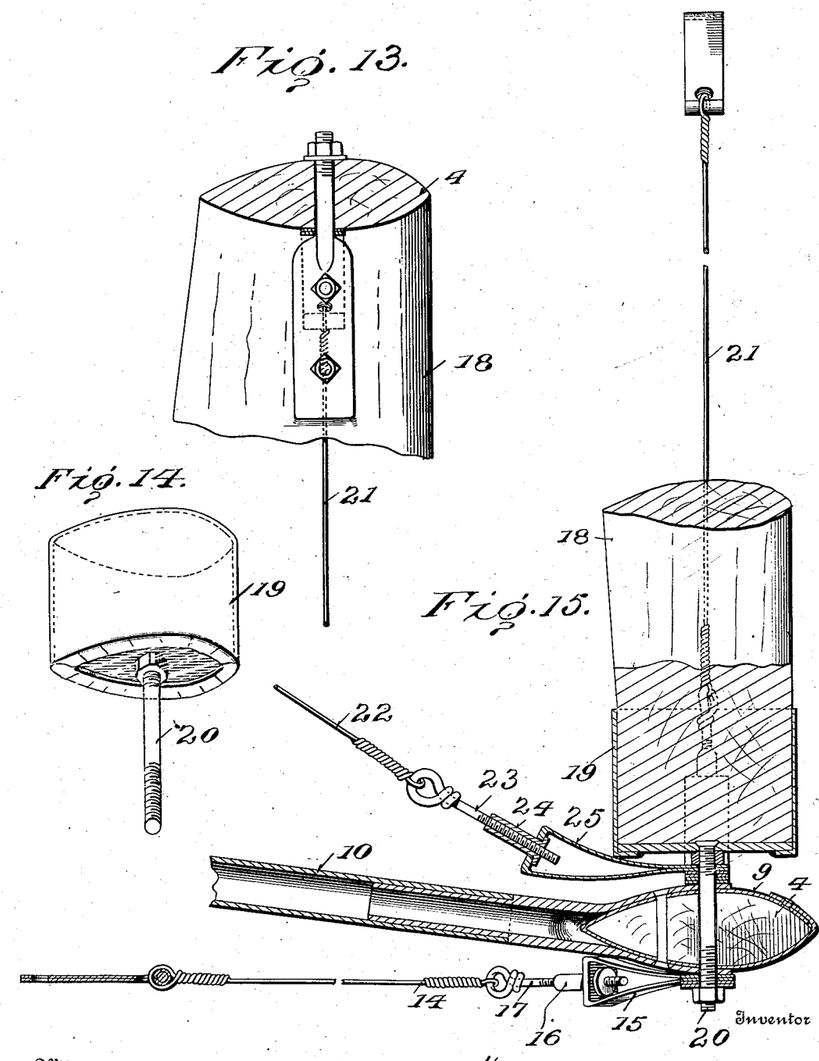

Near the central portion of the machine the struts 18 are placed somewhat close together, as shown in Fig. 1, and from this central portion outward toward the marginal lines of the supporting surfaces they are placed preferably at wider intervals. The length of the struts at the middle portion of the machine is approximately that of the depth of the supporting surface at that point from front to rear, and the lengths of the other struts on either side of the central struts out to the marginal lines of the supporting surfaces gradually decrease, the length, however, of any given strut being approximately equal to the depth of the supporting surfaces from front to rear at the point where the strut is placed. There is a forward series of these struts resting on the forward line of the framework 4 and a rear series of these struts resting on the rear portion of said framework, each of the struts having its greatest thickness from front to rear and its least thickness from side to side, and each presenting a front cutting edge so as to offer the minimum of resistance to forward movement through the air. The struts being thus assembled in position with their upper and lower ends entering the sockets 19, the entire structure is bound together into a rigid whole by means of a series of truss wires. Thus, referring to Fig. 1, there are truss-wires 21 extending from the top of each strut to the bottom of each laterally adjacent strut, and from the bottom of each strut to the top of each laterally adjacent strut. In addition to this, preferably there are truss-wires extending from the top of each forward strut to the bottom of each strut immediately in the rear thereof and from the bottom of each forward strut to the top of each strut immediately in the rear thereof, as is shown by the truss-wires 22, 22, Fig. 6. All of said wires are provided with a suitable means for tightening the same, as, for example, the screw-threaded rod 23 and nut 24, as shown in Fig. 11, which rod and nut are connected to a suitable clip 25. Any other suitable means for tightening the truss-wires and any other suitable form of socket for receiving the ends of the various members may be employed without departing from the spirit of the present invention, but the form shown and described has been found to be efficient and is the one preferred. Referring to Fig. 1, it will be seen that the struts 18 thus constitute compression members in a truss construction in which the middle struts 18 are considerably longer than the struts on each side thereof, and particularly, longer than the marginal struts 18, and that, therefore, if the central struts are of the same transverse sectional area as the shorter marginal struts, they would, by reason of their greater length, bend or yield more readily under the same bending or compression strain. To avoid this it would ordinarily become necessary to increase the cross-sectional area of the longer struts over that of the shorter struts. But as this increase in cross-sectional area would mean not only increase in weight to the machine but an increased resistance to the forward movement of the machine through the air, provision is made by the present invention for maintaining the cross-sectional area of all of the struts substantially the same, and this at the minimum. This is accomplished by means of transverse stays or truss-wires extending from one strut or compression member to the one next adjacent thereto, said truss-wires being securely fastened to each strut or compression member. Preferably there are two of these truss-wires extending between adjacent struts, one near the top and one near the bottom, and the united series of truss-wires may constitute bow-string truss-wires 26 extending, as chords, so to speak, from each corner of the frame of each supporting surface entirely across the machine in a straight line, said bow-string truss-wires being secured to and preferably passing through each of the struts. Preferably each chord or truss-wire is made in sections so as to adjust the lengths of the respective portions thereof between the respective struts, which adjustment is provided for by means of the nut and screw-threaded connections 27, illustrated in detail in Fig. 2, in which the screw-threaded rods 28, forming a part of the truss-wires 26, pass through the struts 18 and are fixedly secured to the said struts in the manner clearly illustrated in Fig. 2. When the bow-string truss-wire 26 is thus applied, the portions of the longer struts that would yield to the bending strain are those portions lying between the two truss-wires in Fig. 1, and, as these wires are parallel it follows that the portions of the struts or compression members included between them are of equal length, and, therefore, may be of equal cross-sectional area. With the two supporting surfaces thus assembled the front elevation of the machine will be that shown in Fig. 1, thickest, and, therefore, strongest at the center where the greatest strain occurs and gradually tapering, spar-like, from this point of greater strain toward the marginal portions where the least strain occurs.

Figure 3:
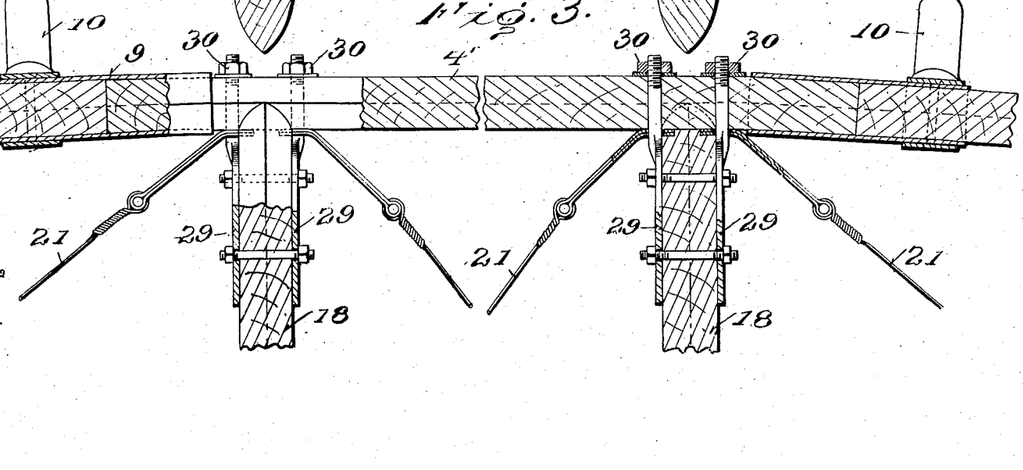
Fig. 3 is a horizontal section through the forward rib of one of the supporting surfaces showing the means of attaching the central vertical struts or compression members thereto.

While the several struts 18 of the machine are preferably held in position by their upper and lower ends resting in sockets 19, as illustrated in Figs. 11, 12, 13, 14, and 15, the two struts immediately on opposite sides of the longitudinal medial line of the machine are preferably secured fixedly to a portion 4' of the framework of the machine, and, as here shown, (Fig. 3) this is accomplished by bolting metal bars 29, 29, to said struts with the screw-threaded ends of the bars projecting beyond the struts and through the portion 4' of the framework where they are engaged by nuts 30, so that said struts and the framework are fixedly united. In this construction the guy-wires 21 are provided with eyes through which extend the projecting portions of the metal bars 29, 29, so that the guy-wires, the struts and the framework 4' are all secured together by the two bars of metal 29 and the nuts 30, as will be readily understood from an inspection of the drawing.

As before described, the members 10 extending from the front to the rear members of the framework of each supporting surface do not extend to the rear beyond the framework, and for the purpose of affording a suitable support in the middle portion of the machine for the wire which leads through the rear ends of the ribs 11, bracket-arms 31 (Fig. 10), extend rearward from the rear frame member 4, and these are provided with openings 32 in their rear ends (Fig. 10), for receiving the wire which supports the rear edge of the fabric constituting the supporting surface. These bracket-arms 31 are supported in sockets 33 riveted or otherwise secured to the sockets 9. These rearwardly extending bracket-arms are only employed at a point on each side of the longitudinal medial portion of the machine and their employment is rendered desirable by reason of the fact that the ribs 11 would otherwise be spaced too far apart, and, therefore, would not afford suitable support for the fabric at this point. As thus constructed, the structure consists of two superposed supporting surfaces rigidly united into a non-flexible structure affording a maximum of supporting surface combined with a minimum of weight and of resistance to forward movement through the air.

Any desired or suitable means may be employed for propelling the structure through the air, for maintaining the lateral balance thereof, for steering the same, or for launching the machine at the commencement of a flight. As the aforementioned means constitute no part of the present invention they need be referred to but briefly.

As here shown the machine is mounted as a whole on a wheeled chassis 34 and is propelled by a screw propeller 35 driven by any suitable motor 36. The machine may be steered by any suitable steering mechanism, as a vertical rudder, not shown, and the lateral balance may be effected by means of lateral balance rudders 37, 37, one or more of which may be mounted on opposite sides of the fore and aft medial line of the machine, said rudders, however, constituting no part of the supporting surface. Suitable means are, or may be, provided for manipulating these rudders to maintain or restore the lateral balance of the machine, but since these rudders and the means for manipulating the same form no part of the present invention, it will not be necessary to more specifically describe the same herein.

Mounted on a wheeled chassis, as shown herein, the machine is launched directly from the ground, and during the time it is advancing on the ground the upturned lateral margins of the lower supporting surface enable it to more readily clear any obstructions, like stones or bushes, that may be on either side of the road, and, when the machine has risen in the air, the concavo-convex form of the supporting surface renders the machine less liable to disturbances from cross currents of air or gusts of wind, since the depressing effect of such cross gusts upon the upper side of said upper supporting surface will be largely neutralized by the elevating effect of such gust upon the underside of the lower supporting surface, so that this concavo-convex structure not only lends itself to great rigidity of construction and facilitates the movement of the machine while on the ground, but also contributes materially to the steadiness of the machine while in the air.

It is well-known in this art that supporting surfaces which have less depth from front to rear at their marginal portions than at their central portions, possess certain advantages in effecting turning movements in the air; and furthermore, it has been established that when two supporting surfaces are superposed one above the other, the distance between the supporting surfaces should be approximately the depth of the supporting surfaces from front to rear. It will be perceived, therefore, that in the present structure by superposing the supporting surfaces one above the other with their concave sides toward each other, there is obtained not only an exceedingly rigid structure but such a rigid structure combined with the stable qualities of supporting surfaces which taper or become narrower toward their lateral margins, and that, without departing from the principle which requires that the superposed supporting surfaces should be spaced the one above the other at a distance equal to the depth of the supporting surfaces from front to rear.

It will be understood that the structure thus hereinbefore specifically described may be varied in a great number of its details, and that certain features thereof may be used in the absence of others without departing from the spirit of the invention, and such changes in details of construction and such uses of some of the features in the absence of others, are intended to be within the scope of the claims hereto appended.

What I claim is:—

1. In a flying machine, the combination of a plurality of separate independent concavo-convex supporting surfaces united with their concave sides toward each other, each of said supporting surfaces having its greatest depth from front to rear at its central portion and having a gradually decreasing depth from front to rear from said central portion to its lateral marginal lines.

2. In a flying machine, the combination of a pair of superposed supporting surfaces spaced farthest apart at their central portion and gradually approaching each other toward their lateral edge portions, a series of spacing struts arranged in a line extending from one lateral edge of the structure to the other, and a chord or truss-wire extending in a straight line from the outer strut on one side of the structure to the outer strut on the other side and secured to each of said series of struts.

3. In a flying machine, the combination of a plurality of separate independent concavo-convex supporting surfaces having their concave sides toward each other, a front and a rear series of struts, each strut extending from one supporting surface to the other, with a front and a rear chord or truss-wire extending across the concave side of each supporting surface.

4. In a flying machine, the combination of a plurality of concavo-convex supporting surfaces having their concave surfaces toward each other, a front and a rear series of struts, each strut extending from one supporting surface to the other, with a front and a rear chord or truss-wire extending across the concave side of each supporting surface and secured to said struts.

5. In a flying machine, the combination of a plurality of separate independent superposed concavo-convex supporting surfaces having their concave sides toward each other and each having a depth from front to rear gradually decreasing from the center to the lateral margins, a series of vertical struts separating said supporting surfaces, and diagonal truss members extending from the top of each strut to the bottoms of the adjacent struts on each side thereof.

6. In a flying machine, the combination of a plurality of superposed concavo-convex supporting surfaces having their concave sides toward each other, a series of vertical struts separating said supporting surfaces, diagonal truss members extending from the top of each strut to the bottoms of the adjacent struts on each side thereof, and a chord or truss-wire extending across the concave side of each supporting surface in the line of said series of struts and secured to each strut.

7. In a flying machine, the combination of a plurality of separate independent concavo-convex supporting surfaces having their concave sides toward each other, a front and a rear series of struts gradually decreasing in length from the center to the lateral margins of said surfaces, said struts extending from one supporting surface to the other, a diagonal truss member extending from the top of each strut to the bottom of each adjacent strut in the series, and a truss member extending from the top of each strut of one series to the bottom of the opposite strut in the other series.

8. In a flying machine, the combination of a plurality of concavo-convex supporting surfaces having their concave sides toward each other, a front and a rear series of struts, said struts extending from one supporting surface to the other, a diagonal truss member extending from the top of each strut to the bottom of each adjacent strut in the series, a truss member extending from the top of each strut of one series to the bottom of the opposite strut in the other series, and a front and a rear chord or truss-wire, each extending across the concave side of each supporting surface in the line of the series of struts and secured to each strut of the series.

9. In a flying machine, the combination of a plurality of concavo-convex supporting surfaces having their concave sides toward each other, with a series of struts separating the surfaces, a chord or truss-wire extending across the concave side of each supporting surface and secured to the struts, and means for adjusting the length of said chord or truss-wire between the struts.

10. In a flying machine, two superposed supporting surfaces each of said surfaces having frames formed in a series of sections which abut each other, struts separating said frames and abutting the laterally-extending portions thereof, and truss-members uniting the whole into a rigid structure.

11. In a flying machine, two superposed supporting surfaces each of said surfaces having frames formed in a series of sections which abut each other, struts separating said supporting surfaces and abutting the laterally-extending portions of the two frames, and adjustable truss-members uniting the whole into a rigid structure.

12. In a flying machine, a pair of separate independent concavo-convex supporting surfaces superposed one above the other with their concave sides toward each other, struts separating the supporting surfaces and abutting the framework thereof, and adjustable truss members uniting the whole into a rigid unyielding structure.

In testimony whereof I have signed this specification in the presence of two subscribing witnesses.

FREDERICK W. BALDWIN.

Witnesses:
   ALEXANDER GRAHAM BELL,
   F. A. DOUGLAS MCCURDY.